US010222930B2

(12) United States Patent
Zhao et al.

(10) Patent No.: US 10,222,930 B2
(45) Date of Patent: Mar. 5, 2019

(54) METHOD, APPARATUS, AND STORAGE MEDIUM FOR PLAYING CONTROL PROCESSING OF AUDIO FILE

(71) Applicant: TENCENT TECHNOLOGY (SHENZHEN) COMPANY LIMITED, Shenzhen (CN)

(72) Inventors: Weifeng Zhao, Shenzhen (CN); Shenyuan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 351 days.

(21) Appl. No.: 15/037,012

(22) PCT Filed: Oct. 11, 2014

(86) PCT No.: PCT/CN2014/088420
§ 371 (c)(1),
(2) Date: May 16, 2016

(87) PCT Pub. No.: WO2015/070682
PCT Pub. Date: May 21, 2015

(65) Prior Publication Data
US 2016/0266731 A1  Sep. 15, 2016

(30) Foreign Application Priority Data

Nov. 15, 2013  (CN) .......................... 2013 1 0574051

(51) Int. Cl.
*G06F 3/048* (2013.01)
*G06F 3/0481* (2013.01)
(Continued)

(52) U.S. Cl.
CPC ............ *G06F 3/0481* (2013.01); *G06F 3/162* (2013.01); *G06K 9/46* (2013.01); *G10H 1/0008* (2013.01);
(Continued)

(58) Field of Classification Search
CPC ............................. G06F 3/0481; G06F 3/162
(Continued)

(56) References Cited

U.S. PATENT DOCUMENTS 8,587,604 B1 * 11/2013 Kanter ................ G06F 17/3025
345/581
2015/0067511 A1 * 3/2015 Lee .......................... G06F 3/165
715/716

FOREIGN PATENT DOCUMENTS

CN  201273843 Y  7/2009
CN  101661774 A  3/2010
(Continued)

OTHER PUBLICATIONS

Karessa Natee Bowens, Interactive musical visualization based on emotional and color theory, Texas A&M University, pp. 1-139 (Year: 2010).*

(Continued)

*Primary Examiner* — Andrey Belousov
(74) *Attorney, Agent, or Firm* — Anova Law Group, PLLC

(57) ABSTRACT

Embodiments of the present invention provide a method, an apparatus, and a storage medium for playing control processing of an audio file. The method may include: acquiring an album image corresponding to an audio file to be processed; performing color analysis on the album image, to determine playing colors of the audio file; and performing the playing control processing on the audio file by using the determined playing colors. In the embodiments of the pres- (Continued)

ent invention, a personalized playing color can be determined for an audio file, and the playing color of the audio file can effectively represent a style property of the audio file, thereby improving intelligence of playing control processing of the audio file.

11 Claims, 7 Drawing Sheets

(51) Int. Cl.
    *G10H 1/00*     (2006.01)
    *G06F 3/16*     (2006.01)
    *G06K 9/46*     (2006.01)
(52) U.S. Cl.
    CPC .... *G06T 2200/24* (2013.01); *G10H 2240/085* (2013.01)

(58) Field of Classification Search
    USPC ......................................................... 715/716
    See application file for complete search history.

(56) References Cited

FOREIGN PATENT DOCUMENTS

| CN | 101702316 A | | 5/2010 | |
|---|---|---|---|---|
| CN | 104090883 A | | 10/2014 | |
| KR | 20110065972 A | | 6/2011 | |
| KR | 20130024650 | * | 9/2013 | ............... G06F 3/16 |
| KR | 1020130101838 | * | 9/2013 | ............... G06F 3/16 |

OTHER PUBLICATIONS

The World Intellectual Property Organization (WIPO) International Search Report for PCT/CN2014/088420 dated Jan. 14, 2015.

* cited by examiner

METHOD, APPARATUS, AND STORAGE MEDIUM FOR PLAYING CONTROL PROCESSING OF AUDIO FILE

RELATED APPLICATION

This patent application claims priority to PCT Application No. PCT/CN2014/088420, filed on Oct. 11, 2014, which claims priority to Chinese Patent Application No. 201310574051.0, entitled "PLAYING CONTROL PROCESSING OF AUDIO FILE METHOD AND APPARATUS" filed by Tencent Technologies (Shenzhen) Co., Ltd., filed on Nov. 15, 2013, all of which is incorporated by reference in its entirety.

FIELD OF THE TECHNOLOGY

Embodiments of the present invention generally relate to the field of Internet technologies, and specifically, to the technical field of audio processing, and, more particularly, relates to a method, an apparatus, and a storage medium for playing control processing of an audio file and.

BACKGROUND OF THE DISCLOSURE

A playing color of an audio file may represent a style property of the audio file to a certain degree. For example, a dark playing color may represent an audio file having a melancholy style, a bright playing color may represent an audio file having a happy style, and the like. At present, usually no attention has been paid to a playing color of the audio file in a playing control processing process of the audio file. For example, when multiple audio files are played and controlled by using a player, a playing color of each audio file is a color of a player interface, and the color of the player interface is mostly a fixed color, so that a playing color of each audio file lacks personality and uniqueness, and a style property of each audio file cannot be effectively represented, and at the same time intelligence of playing control processing of an audio file is reduced.

SUMMARY

Embodiments of the present invention provide a method, an apparatus, and a storage medium for playing control processing of an audio file, so that a personalized playing color can be determined for an audio file, and the playing color of the audio file can effectively represent a style property of the audio file, thereby improving intelligence of playing control processing of the audio file.

An embodiment of the present invention provides a method for playing control processing of an audio file, which may include:

acquiring an album image corresponding to an audio file to be processed;

performing color analysis on the album image, to determine playing colors of the audio file; and performing the playing control processing on the audio file by using the determined playing colors.

Another embodiment of the present invention provides an apparatus for playing control processing of an audio file, which may include:

an image acquisition module, configured to acquire an album image corresponding to an audio file to be processed;

an analysis module, configured to perform color analysis on the album image, to determine playing colors of the audio file; and a playing control processing module, configured to perform the playing control processing on the audio file by using the determined playing colors.

Another embodiment of the present invention provides a non-transitory computer readable storage medium including a computer executable instruction stored thereon, the computer executable instruction being used for, when being executed by a processor of a computer, executing a method for playing control processing of an audio file, the method including:

acquiring an album image corresponding to an audio file to be processed;

performing color analysis on the album image, to determine playing colors of the audio file; and performing the playing control processing on the audio file by using the determined playing colors.

The implementation of the embodiments of the present invention has the following beneficial effects.

In the embodiments of the present invention, a playing color of an audio file is determined based on color analysis on an album image corresponding to an audio file. Because an album image can represent a style property of a corresponding audio file to a certain degree, a playing color determined based on the album image can represent the style property of the audio file in a personalized and unique manner. In the embodiments of the present invention, playing control processing is performed on the audio file by using the determined playing color, thereby effectively improving intelligence of playing control processing of the audio file.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may still make changes and replacements to these accompanying drawings.

DESCRIPTION OF EMBODIMENTS

The following clearly and completely describes the technical solutions in the embodiments of the present invention with reference to the accompanying drawings in the embodiments of the present invention. Apparently, the described embodiments are some of the embodiments of the present invention rather than all of the embodiments, and are used for explaining the principle of the present disclosure rather than to limit the present disclosure to these specific embodiments. All other embodiments obtained by a person of ordinary skill in the art based on the embodiments of the present invention without creative efforts shall fall within the protection scope of the present disclosure.

In embodiments of the present invention, an audio file may include, but is not limited to, a file such as music, a music piece and/or a speech piece. The music includes, but is not limited to, a song with accompaniment, a cappella song or an instrumental music. The music piece may correspond to those including, but not limited to, a song piece with accompaniment, a cappella song piece or an instrumental music piece.

A method for playing control processing of an audio file provided in the embodiments of the present invention is introduced below in detail with reference to FIG. 1 to FIG. 3. It should be noted that, the method for playing control processing of an audio file shown in FIG. 1 to FIG. 3 may be executed by an apparatus for playing control processing of an audio file provided in the embodiments of the present invention. The apparatus for playing control processing of an audio file may be operated in a terminal device or a server. The terminal device may include, but is not limited to, a device such as a personal computer (PC), a tablet computer, a mobile phone, an intelligent mobile phone or a laptop computer.

Figure 1:
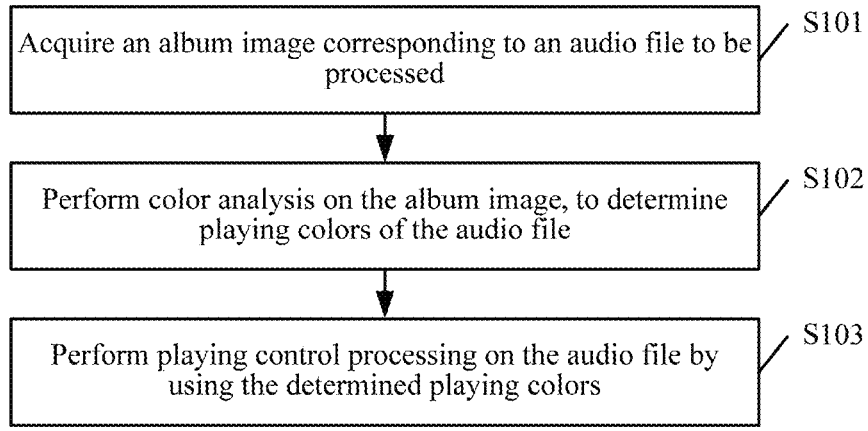
FIG. 1 is a flowchart of a method for playing control processing of an audio file provided in an embodiment of the present invention.

Referring to FIG. 1, FIG. 1 is a flowchart of a method for playing control processing of an audio file provided in an embodiment of the present invention. The method may include exemplary Step S101 to Step S103 below.

S101: Acquire an album image corresponding to an audio file to be processed.

The album image corresponding to the audio file refers to any image included in an album to which the audio file belongs. In this step, the album image corresponding to the audio file to be processed may be acquired from a network. Preferably, the album image acquired in this step may refer to a cover image of the album to which the audio file belongs, or may refer to an image, chosen from the album to which the audio file belongs, for the audio file.

In addition, in the embodiment of the present invention, an image library may also be created locally in advance. An album image corresponding to at least one audio file is stored in the image library. The acquiring an album image corresponding to an audio file to be processed may be specifically: first searching a local album image library for an album image corresponding to the audio file to be processed; and acquiring, from another device by using a network, the album image corresponding to the audio file to be processed if the search fails.

S102: Perform color analysis on the album image, to determine playing color(s) of the audio file.

A color of an album image may represent a style property of a corresponding audio file to a certain degree. For example, an image having a dark color (for example, black and/or gray) is usually chosen as an album image for an audio file having a melancholy style; an image having a neutral color (for example, blue and/or green) is usually chosen as an album image for an audio file having a quiet relaxing style; an image having a bright color (for example, red and/or yellow) is usually chosen as an album image for an audio file having a happy style; and the like. In this step, the playing color of the audio file is determined by performing color analysis on the album image, so that the determined playing color can represent a style property of the audio file.

The performing color analysis on the album image, to determine playing color(s) of the audio file may be specifically:

performing color analysis on the album image corresponding to the audio file to be processed, to obtain at least one color included in the album image; and directly choosing one of the obtained colors as the playing color of the audio file, or mapping, according to a set mapping relationship, the obtained at least one color to at least one color set in advance, and choosing one of the colors obtained after mapping as the playing color of the audio file.

S103: Perform playing control processing on the audio file by using the determined playing color.

In this step, in a process of playing control of the audio file, the determined playing color may be used for performing color rendering processing on a playing interface of the audio file and output the playing interface after the color rendering processing, so that the playing interface of the audio file can represent a style property of the audio file in a personalized and unique manner.

Figure 2:
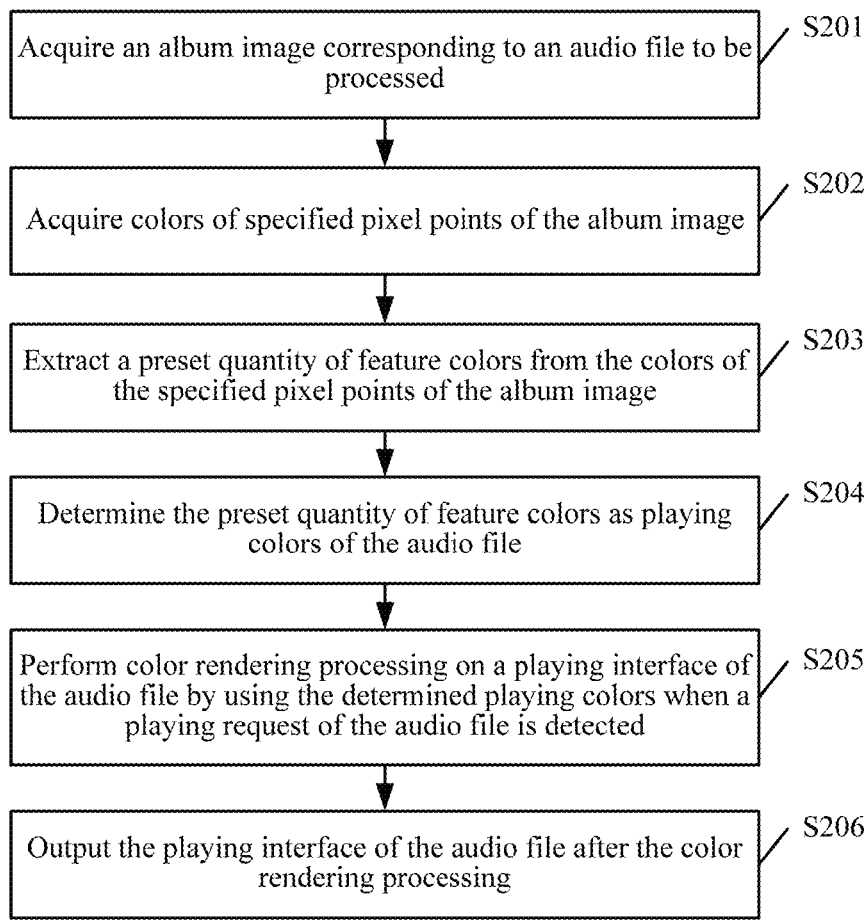
FIG. 2 is a flowchart of another method for playing control processing of an audio file provided in an embodiment of the present invention.

Referring to FIG. 2, FIG. 2 is a flowchart of another method for playing control processing of an audio file provided in an embodiment of the present invention. The method may include exemplary Step S201 to Step S206 below.

S201: Acquire an album image corresponding to an audio file to be processed.

Reference may be made to Step S101 in the embodiment shown in FIG. 1 for Step S201 in this embodiment, without being further elaborated herein.

S202: Acquire colors of specified pixel points of the album image.

An album image is formed by multiple pixel points being arranged according to information such as positions and colors. A color of each pixel point of the album image may be represented by using a red green blue (RGB) format. For example, a color value of a first pixel point of the album image may be represented as $(r_1,g_1,b_1)$; a color value of a second pixel point of the album image may be represented as $(r_2,g_2,b_2)$; . . . ; a color value of an $n^{th}$ (n is a positive integer) pixel point of the album image may be represented as $(r_n,g_n,b_n)$; and so on. In this step, the specified pixel points may be specified as all pixel points of the album image, or may be specified as some of the pixel points of the album image.

S203: Extract a preset quantity of feature colors from the colors of the specified pixel points of the album image.

The preset quantity of feature colors may be used for reflecting a basic color of the album image. The basic color may include a primary color and a secondary color. It may be understood that the preset quantity is less than or equal to a quantity of the specified pixel points, and the preset quantity may be set according to an actual requirement. For example, the preset quantity may also be set to M+N, and values of M and N are both integers greater than 0 or equal to 0, where M may represent a quantity of feature colors that reflect the primary color of the album image, N may represent a quantity of feature colors that reflect the secondary color of the album image, and the preset quantity is a sum of the quantity of the feature colors of the primary color and the quantity of the feature colors of the secondary color of the album image. In this step, the preset quantity of feature colors may be extracted from the colors of the specified pixel points of the album image by using a color histogram algorithm; or the preset quantity of feature colors may be extracted from the colors of the specified pixel points of the album image by using a clustering algorithm, for example, a K-Nearest Neighbor (KNN) algorithm.

S204: Determine the preset quantity of feature colors as playing colors of the audio file.

According to the example in Step S203, in this step, the extracted M+N feature colors may be determined as the playing colors of the audio file. Because a color of an album image may represent a style property of a corresponding audio file to a certain degree, the feature colors extracted from the album image are determined as the playing colors of the audio file, and the playing colors can represent a style property of the audio file in a personalized and unique manner.

Step S202 to Step S204 in this embodiment may provide detailed steps for the Step S102 in the embodiment shown in FIG. 1.

S205: Perform color rendering processing on a playing interface of the audio file by using the determined playing colors when a playing request of the audio file is detected.

In this step, color rendering processing may be performed on the playing interface of the audio file by using the determined playing colors in a process of playing control of the audio file when the playing request of the audio file is detected. A process of color rendering processing in this step may specifically include the following exemplary Steps A to C:

A: Determine a color rendering processing area in the playing interface of the audio file according to a preset area range.

The preset area range may be set according to an actual requirement. For example, the preset area range may be set as the entire area of the playing interface of the audio file; or, the preset area range may be set as a partial area of the playing interface of the audio file.

B: Choose, from the determined playing colors, at least one playing color as a background color, and perform color rendering processing on a background of the color rendering processing area.

According to the examples in Step S203 and Step S204 in this embodiment, the determined playing colors are M+N colors. In this step B, one or more playing colors may be randomly chosen from the M+N colors as background colors, and color rendering processing is performed on a background of the color rendering processing area.

C: Choose, from playing colors other than the background color of the determined playing colors, at least one playing color as a font color, and perform color rendering processing on a font of the color rendering processing area.

According to the examples in Step S203 and Step S204 in this embodiment, the determined playing colors are M+N colors. In this step C, one or more playing colors may be randomly chosen from playing colors other than the background colors of the M+N colors as font colors, and color rendering processing is performed on a font of the color rendering processing area.

S206: Output the playing interface of the audio file after color rendering processing.

In this step, the playing interface of the audio file after color rendering processing may be displayed, so that a user can intuitively perceive a style property of the audio file according to the displayed playing interface of the audio file.

Figure 3:
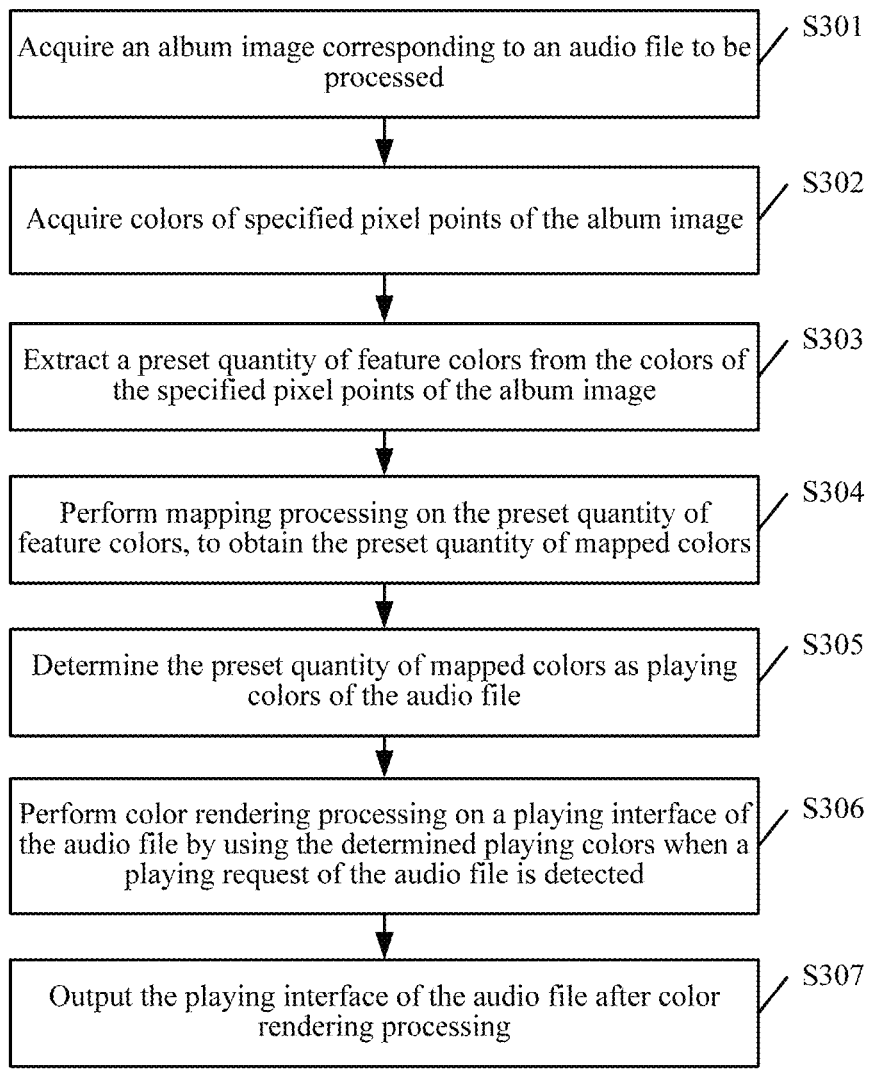
FIG. 3 is a flowchart of still another method for playing control processing of an audio file provided in an embodiment of the present invention.

Referring to FIG. 3, FIG. 3 is a flowchart of still another method for playing control processing of an audio file provided in an embodiment of the present invention. The method may include exemplary Step S301 to Step S307 described above.

S301: Acquire an album image corresponding to an audio file to be processed.

S302: Acquire colors of specified pixel points of the album image.

S303: Extract a preset quantity of feature colors from the colors of the specified pixel points of the album image.

Reference may be made to Step S201 to Step S203 in the embodiment shown in FIG. 2 for Step S301 to Step S303 in this embodiment without being further elaborated herein.

S304: Perform mapping processing on the preset quantity of feature colors, to obtain the preset quantity of mapped colors.

In this step, the performing mapping processing on the preset quantity of feature colors may include the following two feasible implementation manners. In one feasible implementation manner, a process of the mapping processing in Step S304 may include the following Steps D to F:

D: Read a preset first color mapping table, the preset first color mapping table including at least one mapped color and a color value range of each mapped color.

In this step D, a quantity of mapped colors included in the preset first color mapping table may be set according to an actual requirement. For example, the mapped colors may be 216 web-safe colors. The color value range of each mapped color may be represented by using an RGB format. For example, a color value range of the mapped color green may be represented as $(r_{green}, g_{green}, b_{green})$, where $r_{green} \in (r_x, r_y)$, $g_{green} \in (g_x, g_y)$, and $b_{green} \in (b_x, b_y)$, and where $r_x < r_y$, $g_x < g_y$, and $b_x < b_y$.

E: Acquire a color value of each feature color of the preset quantity of feature colors.

In this step E, the color value of each feature color may be represented by using an RGB format. For example, a color value of a feature color may be represented as $(r_1, g_1, b_1)$.

F: Map each feature color, such as a current feature color, in the preset quantity of feature colors to a mapped color in the preset first color mapping table according to the preset first color mapping table and the color value of each feature color of the preset quantity of feature colors.

Specifically, the mapping each feature color of the preset quantity of feature colors to a mapped color in the preset first color mapping table may include:

traversing each feature color of the preset quantity of feature colors, and determining a color value range, in the first color mapping table, to which a color value of a currently traversed feature color belongs; and mapping the currently traversed feature color to a mapped color, corresponding to the determined color value range, in the first color mapping table.

According to the examples in Steps D and E, in this step F, if $r_1 \in (r_x, r_y)$, $g_1 \in (g_x, g_y)$, and $b_1 \in (b_x, b_y)$, the feature color whose color value is $(r_1, g_1, b_1)$ shown in Step E may be mapped to green color in the preset first color mapping table; this step F is repeated, so that each feature color of the preset quantity of the feature colors can be respectively mapped to a mapped color in the preset first color mapping table.

In the other feasible implementation manner, a process of the mapping processing in Step S304 may include exemplary Steps G to J below:

G: Read a preset second color mapping table, the preset second color mapping table including at least one mapped color and a color value of each mapped color.

In this step G, a quantity of mapped colors included in the preset second color mapping table may be set according to an actual requirement. For example, the mapped colors may be 216 web-safe colors. The color value of each mapped color may be represented by using an RGB format. For example, it is assumed that the preset second color mapping table includes 2 mapped colors in total, where a color value of one mapped color green may be represented as $(r_{green}, g_{green}, b_{green})$, and a color value of the other mapped color red may be represented as $(r_{red}, g_{red}, b_{red})$.

H: Acquire a color value of each feature color of the preset quantity of feature colors.

In this step H, the color value of each feature color may be represented by using an RGB format. For example, it is assumed that the preset quantity is 2, where the color value of one feature color may be represented as $(r_1, g_1, b_1)$, and the color value of the other feature color may be represented as $(r_2, g_2, b_2)$.

I: Calculate a Euclidean distance between each feature color of the preset quantity of feature colors and each mapped color in the preset second color mapping table.

That is, calculate a Euclidean distance between the color value of each feature color of the preset quantity of feature colors and a color value of each mapped color in the preset second color mapping table.

According to the examples in Steps G and H, in this step I, a Euclidean distance between $(r_1, g_1, b_1)$ and $(r_{green}, g_{green}, b_{green})$ and a Euclidean distance between $(r_1, g_1, b_1)$ and $(r_{red}, g_{red}, b_{red})$ need to be calculated; and a Euclidean distance between $(r_2, g_2, b_2)$ and $(r_{green}, g_{green}, b_{green})$ and a Euclidean distance between $(r_2, g_2, b_2)$ and $(r_{red}, g_{red}, b_{red})$ need to be calculated.

J. For each feature color, such as a current feature color, in the preset quantity of feature colors, determine a mapped color, having a minimum Euclidean distance from a current feature color, in the preset second color mapping table as a mapped color of the current feature color, to obtain the preset quantity of mapped colors.

According to the example in Step I, if the Euclidean distance between $(r_1, g_1, b_1)$ and $(r_{green}, g_{green}, b_{green})$ is less than the Euclidean distance between $(r_1, g_1, b_1)$ and $(r_{red}, g_{red}, b_{red})$, the feature color represented by $(r_1, g_1, b_1)$ is mapped to green color in the preset second color mapping table; if the Euclidean distance between $(r_2, g_2, b_2)$ and $(r_{green}, g_{green}, b_{green})$ is greater than the Euclidean distance between $(r_2, g_2, b_2)$ and $(r_{red}, g_{red}, b_{red})$, the feature color represented by $(r_2, g_2, b_2)$ is mapped to red color in the preset second color mapping table.

It should be noted that in the two implementation manners shown in Step S304, one of or a combination of two of the two implementation manners may be flexibly selected according to an actual requirement to perform mapping processing. Moreover, after mapping processing is performed on the preset quantity of feature colors, the obtained preset quantity of mapped colors may be completely different, partially same or completely same. For example, according to the example in Step J, if the Euclidean distance between $(r_1, g_1, b_1)$ and $(r_{green}, g_{green}, b_{green})$ is than the Euclidean distance between $(r_1, g_1, b_1)$ and $(r_{red}, g_{red}, b_{red})$, the feature color represented by $(r_1, g_1, b_1)$ is mapped to green color in the preset second color mapping table; if the Euclidean distance between $(r_2, g_2, b_2)$ and $(r_{green}, g_{green}, b_{green})$ is also less than the Euclidean distance between $(r_2, g_2, b_2)$ and $(r_{red}, g_{red}, b_{red})$, the feature color represented by $(r_2, g_2, b_2)$ is mapped to green color in the preset second color mapping table. In this case, although a quantity of the obtained mapped colors is 2, both the mapped colors are green, and the color values of the mapped colors are consistent.

S305: Determine the preset quantity of mapped colors as playing colors of the audio file.

A more desirable color presentation effect can be obtained with the mapped color as compared with the feature colors. In this step, the preset quantity of mapped colors may be determined as the playing colors of the audio file, so that the playing colors can represent a style property of the audio file in a personalized and unique manner, and meanwhile a relatively desirable color presentation effect can be obtained.

Step S302 to Step S305 in this embodiment may provide detailed steps for the Step S102 in the embodiment shown in FIG. 1.

S306: Perform color rendering processing on a playing interface of the audio file by using the determined playing colors when a playing request of the audio file is detected.

S307: Output the playing interface of the audio file after color rendering processing.

Reference may be made to Step S205 and Step S206 in the embodiment shown in FIG. 2 for Step S306 and Step S307 in this embodiment, without being further elaborated herein.

By using the descriptions of the embodiments shown in FIG. 1 to FIG. 3 described above, in the embodiment of the present invention, a playing color of an audio file is determined based on color analysis on an album image corresponding to an audio file. Because an album image can represent a style property of a corresponding audio file to a certain degree, a playing color determined based on the album image can represent the style property of the audio file in a personalized and unique manner. In the embodiment of the present invention, playing control processing is performed on the audio file by using the determined playing color, thereby effectively improving intelligence of playing control processing of the audio file.

In addition, in the technical solutions provided in the embodiments of the present invention, after a preset quantity of feature colors are extracted from colors of specified pixel points of an album image, color rendering processing is not directly performed on a playing interface of an audio file according to the extracted feature colors, and instead, mapping processing is performed on the extracted feature colors based on a set mapping relationship, and color rendering processing is performed on the playing interface of the audio file according to obtained mapped colors. In this way, in a case that the extracted feature colors are relatively unacceptable to a user, the feature colors can be mapped to relatively mild mapped colors, so that color rendering is performed on the playing interface of the audio file to obtain the mapped colors. Moreover, in a case that feature colors of multiple audio files that are played continuously are different, these feature colors may also be mapped to one mapped color; in this way, a defect that the color of the playing interface is changed frequently within a relatively short time interval, affecting visual experience of the user, can be avoided, thereby implementing control of changing frequency of the playing interface.

It should be noted that, the embodiment of the present invention may be further applied to another related product that changes a color of an interface, and color rendering is performed on the interface according to a color of an image related to the interface.

An apparatus for playing control processing of an audio file provided in the embodiments of the present invention is introduced below in detail with reference to FIG. 4 to FIG. 8. It should be noted that the apparatus for playing control processing of an audio file shown in FIG. 4 to FIG. 8 may be operated in a terminal device or a server, and is configured to execute the method for playing control processing of an audio file shown in FIG. 1 to FIG. 3. The terminal device may include, but is not limited to, a device such as a PC, a PAD, a mobile phone, an intelligent mobile phone or a laptop computer.

Figure 4:
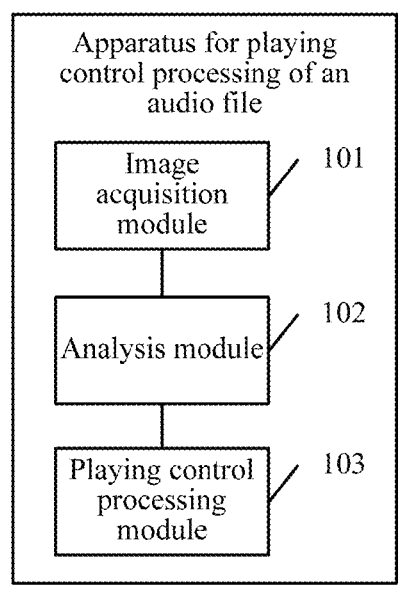
FIG. 4 is a schematic structural diagram of an apparatus for playing control processing of an audio file provided in an embodiment of the present invention.

Referring to FIG. 4, FIG. 4 is a schematic structural diagram of an apparatus for playing control processing of an audio file provided in an embodiment of the present invention. The apparatus may include: an image acquisition module 101, an analysis module 102, and a playing control processing module 103.

The image acquisition module 101 is configured to acquire an album image corresponding to an audio file to be processed.

The album image corresponding to the audio file refers to any image included in an album to which the audio file belongs. The image acquisition module 101 may acquire, from a network, the album image corresponding to the audio file to be processed. Preferably, the album image acquired by the image acquisition module 101 may refer to a cover image of the album to which the audio file belongs, or may refer to an image, chosen from the album to which the audio file belongs, for the audio file.

The analysis module 102 is configured to perform color analysis on the album image, to determine playing color(s) of the audio file.

A color of an album image may represent a style property of a corresponding audio file to a certain degree. For example, an image having a dark color (for example, black and/or gray) is usually chosen as an album image for an audio file having a melancholy style; an image having a neutral color (for example, blue and/or green) is usually chosen as an album image for an audio file having a quiet relaxing style; an image having a bright color (for example, red and/or yellow) is usually chosen as an album image for an audio file having a happy style; and the like. The analysis module 102 determines the playing color of the audio file by performing color analysis on the album image, so that the determined playing color can represent a style property of the audio file.

The playing control processing module 103 is configured to perform playing control processing on the audio file by using the determined playing color(s).

In a process of playing control of the audio file, the playing control processing module 103 may use the determined playing color to perform color rendering processing on a playing interface of the audio file and output the playing interface after color rendering processing, so that the playing interface of the audio file can represent a style property of the audio file in a personalized and unique manner.

Modules of the apparatus for playing control processing of an audio file shown in FIG. 4 are introduced below in detail with reference to FIG. 5 to FIG. 8.

Figure 5A:
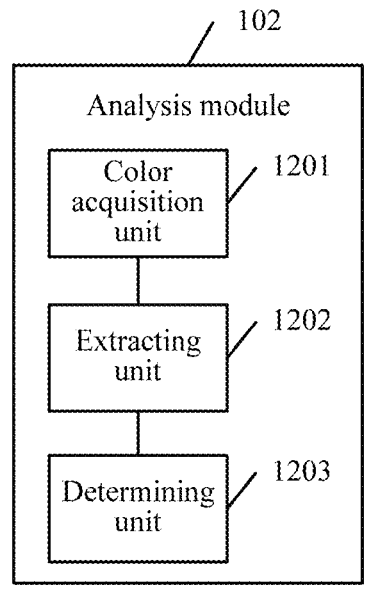
FIG. 5a is a schematic structural diagram of an exemplary analysis module provided in an embodiment of the present invention.

Referring to FIG. 5a, FIG. 5a is a schematic structural diagram of an embodiment of an analysis module provided in an embodiment of the present invention. The analysis module 102 may include: a color acquisition unit 1201, an extracting unit 1202, and a determining unit 1203.

The color acquisition unit 1201 is configured to acquire colors of specified pixel points of the album image.

An album image is formed by multiple pixel points being arranged according to information such as positions and colors. A color of each pixel point of the album image may be represented by using an RGB format. For example, a color value of a first pixel point of the album image may be represented as $(r_1,g_1,b_1)$; a color value of a second pixel point of the album image may be represented as $(r_2,g_2,b_2)$; . . . ; a color value of an $n^{th}$ (n is a positive integer) pixel point of the album image may be represented as $(r_n,g_n,b_n)$; and so on. The specified pixel points may be all pixel points of the album image, or may be some specified the pixel points of the album image.

The extracting unit 1202 is configured to retrieve a preset quantity of feature colors from the colors of the specified pixel points of the album image.

The preset quantity of feature colors may be used for reflecting a basic color of the album image. The basic color may include a primary color and a secondary color. It may be understood that the preset quantity is less than or equal to a quantity of the specified pixel points, and the preset quantity may be set according to an actual requirement. For example, the preset quantity may also be set to M+N, and values of M and N are both integers greater than or equal to 0, where M may represent a quantity of feature colors that reflect the primary color of the album image, and N may represent a quantity of feature colors that reflect the secondary color of the album image. The extracting unit 1202 may retrieve the preset quantity of feature colors from the colors of the specified pixel points of the album image by using a color histogram algorithm; or may retrieve the preset quantity of feature colors from the colors of the specified pixel points of the album image by using a clustering algorithm, for example, a KNN algorithm.

The determining unit 1203 is configured to determine the preset quantity of feature colors as playing colors of the audio file.

According to the example in this embodiment, the determining unit 1203 may determine the extracted M+N feature colors as the playing colors of the audio file. Because a color of an album image may represent a style property of a corresponding audio file to a certain degree, the feature colors extracted from the album image are determined as the playing colors of the audio file, and the playing colors can represent a style property of the audio file in a personalized and unique manner.

Figure 5B:
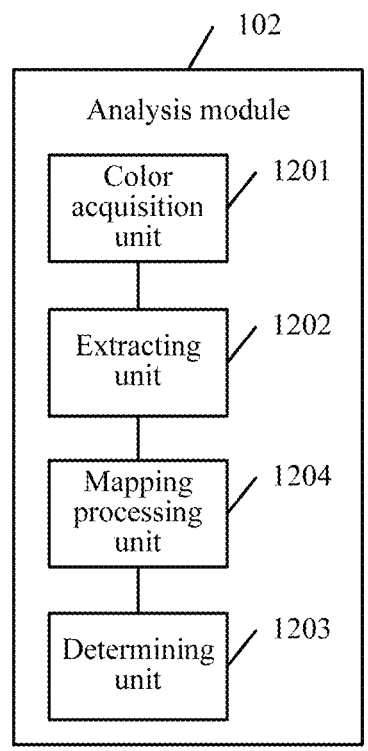
FIG. 5b is a schematic structural diagram of another exemplary analysis module provided in an embodiment of the present invention.

Referring to FIG. 5b, FIG. 5b is a schematic structural diagram of another embodiment of an analysis module provided in an embodiment of the present invention. The analysis module 102 may include: the color acquisition unit 1201, the extracting unit 1202, the determining unit 1203, and a mapping processing unit 1204. Reference may be made to the related description of the embodiment shown in FIG. 5a for the structures and functions of the color acquisition unit 1201, the extracting unit 1202, and the determining unit 1203, without being further elaborated herein.

The mapping processing unit 1204 is configured to perform mapping processing on the preset quantity of feature colors, to obtain the preset quantity of mapped colors. A more desirable color presentation effect can be obtained with the mapped colors as compared with the feature colors.

In this embodiment, the determining unit 1203 is specifically configured to determine the preset quantity of mapped colors as the playing colors of the audio file.

Figure 6A:
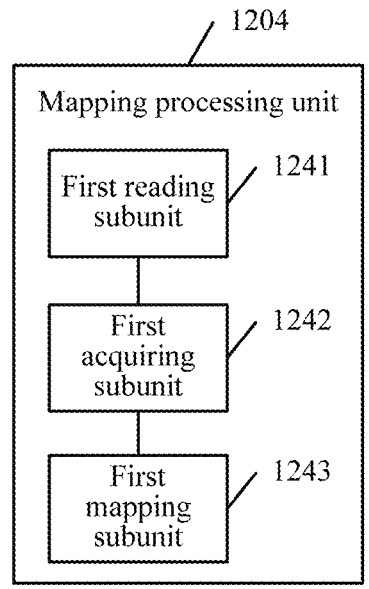
FIG. 6a is a schematic structural diagram of an exemplary mapping processing unit provided in an embodiment of the present invention.

Referring to FIG. 6a, FIG. 6a is a schematic structural diagram of an embodiment of a mapping processing unit provided in an embodiment of the present invention. The mapping processing unit 1204 may include: a first reading subunit 1241, a first acquiring subunit 1242, and a first mapping subunit 1243.

The first reading subunit 1241 is configured to read a preset first color mapping table, the preset first color mapping table including at least one mapped color and a color value range of each mapped color.

A quantity of mapped colors included in the preset first color mapping table may be set according to an actual requirement. For example, the mapped colors may be 216 web-safe colors. A color value range of each mapped color may be represented by using an RGB format. For example, a color value range of the mapped color green may be represented as $(r_{green}, g_{green}, b_{green})$, where $r_{green} \in (r_x, r_y)$, $g_{green} \in (g_x, g_y)$, and $b_{green} \in (b_x, b_y)$, and where $r_x < r_y$, $g_x < g_y$, and $b_x < b_y$.

The first acquiring subunit 1242 is configured to acquire a color value of each feature color of the preset quantity of feature colors.

The color value of each feature color may be represented by using an RGB format. For example, a color value of a feature color may be represented as $(r_1, g_1, b_1)$.

The first mapping subunit 1243 is configured to map each feature color, such as a current feature color, in the preset quantity of feature colors to a mapped color in the preset first color mapping table according to the preset first color mapping table and the color value of each feature color of the preset quantity of feature colors.

According to the example in this embodiment, if $r_1 \in (r_x, r_y)$, $g_1 \in (g_x, g_y)$ and $b_1 \in (b_x, b_y)$, the first mapping subunit 1243 may map the feature color whose color value is $(r_1, g_1, b_1)$ to green color in the preset first color mapping table. The first mapping subunit 1243 repeats the foregoing similar mapping process, each feature color of the preset quantity of feature colors may be mapped to a mapped color in the preset first color mapping table.

Figure 6B:
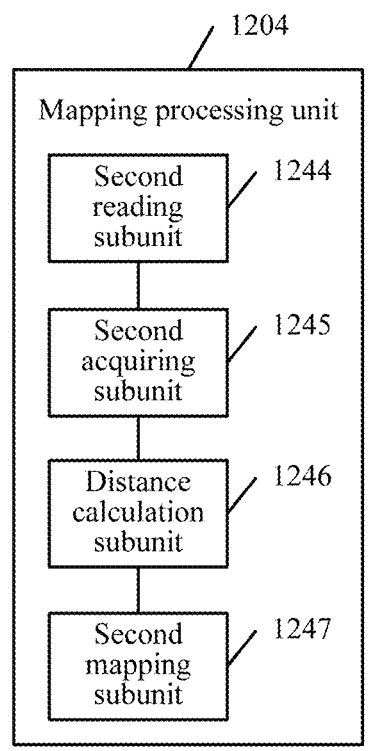
FIG. 6b is a schematic structural diagram of another exemplary mapping processing unit provided in an embodiment of the present invention.

Referring to FIG. 6b, FIG. 6b is a schematic structural diagram of another mapping processing unit provided in an embodiment of the present invention. The mapping processing unit 1204 may include: a second reading subunit 1244, a second acquiring subunit 1245, a distance calculation subunit 1246, and a second mapping subunit 1247.

The second reading subunit 1244 is configured to read a preset second color mapping table, the preset second color mapping table including at least one mapped color and a color value of each mapped color.

A quantity of mapped colors included in the preset second color mapping table may be set according to an actual requirement. For example, the mapped colors may be 216 web-safe colors. A color value of each mapped color may be represented by using an RGB format. For example, it is assumed that the preset second color mapping table includes 2 mapped colors in total, where a color value of one mapped color green may be represented as $(r_{green}, g_{green}, b_{green})$, and a color value of the other mapped color red may be represented as $(r_{red}, g_{red}, b_{red})$.

The second acquiring subunit 1245 is configured to acquire the color value of each feature color of the preset quantity of feature colors.

The color value of each feature color may be represented by using an RGB format. For example, it is assumed that the preset quantity is 2, where a color value of one feature color may be represented as $(r_1, g_1, b_1)$, and a color value of the other feature color may be represented as $(r_2, g_2, b_2)$.

The distance calculation subunit 1246 is configured to calculate a Euclidean distance between each feature color of the preset quantity of feature colors and each mapped color in the preset second color mapping table.

According to the example in this embodiment, the distance calculation subunit 1246 is configured to calculate a Euclidean distance between $(r_1, g_1, b_1)$ and $(r_{green}, g_{green}, b_{green})$ and a Euclidean distance between $(r_1, g_1, b_1)$ and $(r_{red}, g_{red}, b_{red})$; and is configured to calculate a Euclidean distance between $(r_2, g_2, b_2)$ and $(r_{green}, g_{green}, b_{green})$ and a Euclidean distance between $(r_2, g_2, b_2)$ and $(r_{red}, g_{red}, b_{red})$.

The second mapping subunit 1247 is configured to: for each feature color, such as a current feature color, in the preset quantity of feature colors, determine a mapped color, having a minimum Euclidean distance from a current feature color, in the preset second color mapping table as a mapped color of the current feature color, to obtain the preset quantity of mapped colors.

According to the example in this embodiment, if the Euclidean distance between $(r_1, g_1, b_1)$ and $(r_{green}, g_{green}, b_{green})$ is less than the Euclidean distance between $(r_1, g_1, b_1)$ and $(r_{red}, g_{red}, b_{red})$, the second mapping subunit 1247 maps the feature color represented by $(r_1, g_1, b_1)$ to green color in the preset second color mapping table; if the Euclidean distance between $(r_2, g_2, b_2)$ and $(r_{green}, g_{green}, b_{green})$ is greater than the Euclidean distance between $(r_2, g_2, b_2)$ and $(r_{red}, g_{red}, b_{red})$, the second mapping subunit 1247 maps the feature color represented by $(r_2, g_2, b_2)$ to red color in the preset second color mapping table.

Figure 7:
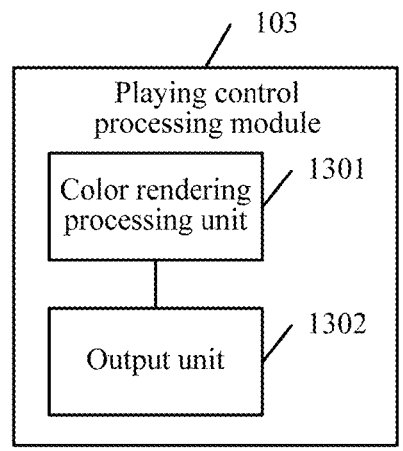
FIG. 7 is a schematic structural diagram of a playing control processing module provided in an embodiment of the present invention.

Referring to FIG. 7, FIG. 7 is a schematic structural diagram of a playing control processing module provided in an embodiment of the present invention. The playing control processing module 103 may include: a color rendering processing unit 1301 and an output unit 1302.

The color rendering processing unit 1301 is configured to: perform color rendering processing on a playing interface of the audio file by using the determined playing colors when a playing request of the audio file is detected.

The color rendering processing unit 1301 may perform color rendering processing on the playing interface of the audio file by using the determined playing colors in a process of playing control of the audio file when the playing request of the audio file is detected.

The output unit 1302 is configured to output the playing interface of the audio file after color rendering processing.

The output unit 1302 may display the playing interface of the audio file after color rendering processing, so that a user can intuitively perceive a style property of the audio file according to the displayed playing interface of the audio file.

Figure 8:
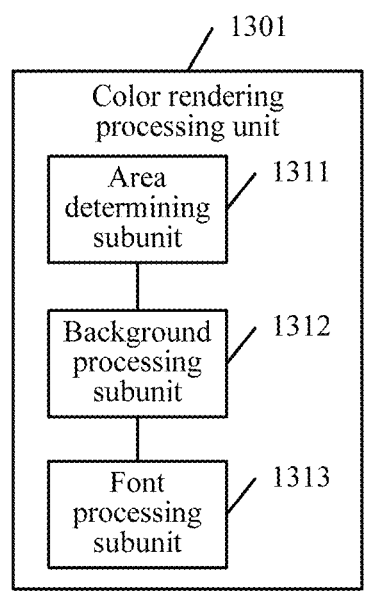
FIG. 8 is a schematic structural diagram of a color rendering processing unit provided in an embodiment of the present invention.

Referring to FIG. 8, FIG. 8 is a schematic structural diagram of a color rendering processing unit provided in an embodiment of the present invention. The color rendering processing unit 1301 may include: an area determining subunit 1311, a background processing subunit 1312, and a font processing subunit 1313.

The area determining subunit 1311 is configured to determine a color rendering processing area in the playing interface of the audio file according to a preset area range.

The preset area range may be set according to an actual requirement. For example, the preset area range may be set as the entire area of the playing interface of the audio file; or, the preset area range may be set as a partial area of the playing interface of the audio file.

The background processing subunit 1312 is configured to choose, from the determined playing colors, at least one playing color as a background color, and perform color rendering processing on a background of the color rendering processing area.

It is assumed that the determined playing colors are M+N colors, and the background processing subunit 1312 may randomly choose, from the M+N colors, one or more playing colors as background colors, and perform color rendering processing on a background of the color rendering processing area.

The font processing subunit 1313 is configured to choose, from playing colors other than the background colors of the determined playing colors, at least one playing color as a font color, and perform color rendering processing on a font of the color rendering processing area.

It is assumed that the determined playing colors are M+N colors, and the font processing subunit 1313 may randomly choose, from playing colors other than the background colors of the M+N colors, one or more playing colors as font colors, and perform color rendering processing on a font of the color rendering processing area.

By using the descriptions of the embodiments shown in FIG. 4 to FIG. 8 above, in the embodiment of the present invention, a playing color of an audio file is determined based on color analysis on an album image corresponding to an audio file. Because an album image can represent a style property of a corresponding audio file to a certain degree, a playing color determined based on the album image can represent the style property of the audio file in a personalized and unique manner. In the embodiment of the present invention, playing control processing is performed on the audio file by using the determined playing color(s), thereby effectively improving intelligence of playing control processing of the audio file.

Figure 9:
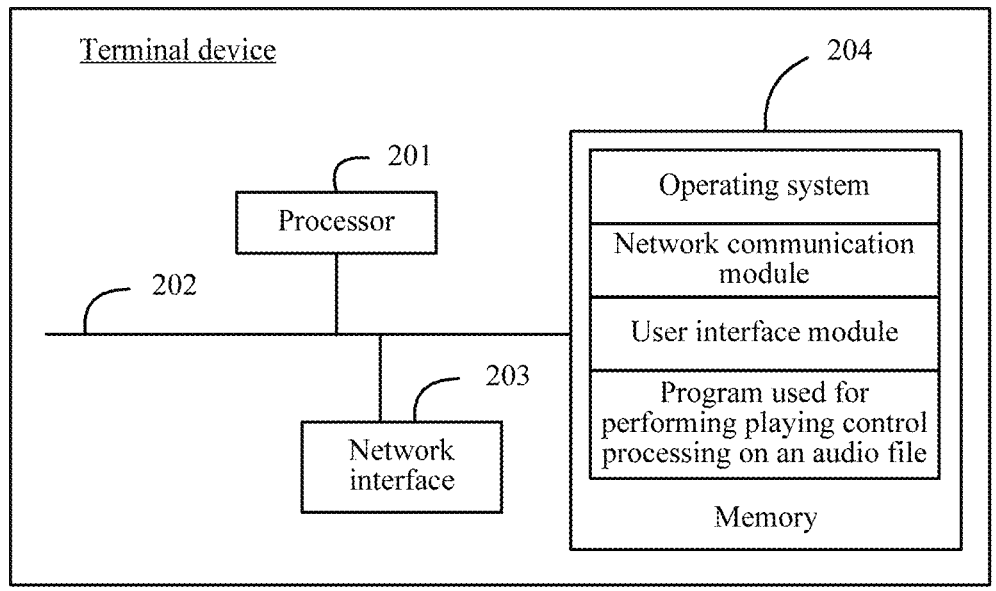
FIG. 9 is a schematic structural diagram of a terminal device provided in an embodiment of the present invention.

Referring to FIG. 9, FIG. 9 is a schematic structural diagram of a terminal device provided in an embodiment of the present invention. The terminal device in the embodiment of the present invention may include, but is not limited to, a device such as a PC, a PAD, a mobile phone, an intelligent mobile phone or a laptop computer. The terminal device includes: at least one processor 201 (for example, a CPU), at least one communication bus 202, at least one network interface 203, and a memory 204. The communication bus 202 is configured to implement connection and communication between these components. The network interface 203 may optionally include a standard wired interface and/or wireless interface (for example, a WI-FI interface or a mobile communication interface). The memory 204 may be a high-speed random access memory (RAM), or may be a non-volatile memory, for example, at least one magnetic disk memory. The memory 204 optionally may further be at least one storage apparatus that is located far away from the foregoing processor 201. As shown in FIG. 9, the memory 204 used as a computer storage medium stores an operating system and a network communication module, and stores a program used for performing playing control processing on an audio file and other programs. In one embodiment, the memory 204 may be a non-transitory computer readable storage medium including a computer executable instruction stored thereon. When being executed by a processor of a computer, the computer executable instruction is used for executing the disclosed method for playing control processing of an audio file.

Specifically, the processor 201 may be configured to invoke the program, used for performing playing control processing on an audio file, stored in the memory 204, to execute the following steps:

acquiring an album image corresponding to an audio file to be processed;

performing color analysis on the album image, to determine playing colors of the audio file; and performing playing control processing on the audio file by using the determined playing colors.

Furthermore, when executing the step of performing color analysis on the album image, to determine a playing color of the audio file, the processor 201 specifically executes the following steps:

acquiring colors of specified pixel points of the album image;

extracting a preset quantity of feature colors from the colors of the specified pixel points of the album image; and determining the preset quantity of feature colors as playing colors of the audio file.

Furthermore, after executing the step of extracting a preset quantity of feature colors from the colors of the specified pixel points of the album image, the processor 201 may further execute the following steps:

performing mapping processing on the preset quantity of feature colors, to obtain the preset quantity of mapped colors, where the determining the extracted preset quantity of feature colors as playing colors of the audio file specifically includes: determining the preset quantity of mapped colors as the playing colors of the audio file.

Furthermore, when executing the step of performing mapping processing on the preset quantity of feature colors, to obtain the preset quantity of mapped colors, the processor 201 specifically executes the following steps:

reading a preset first color mapping table, the preset first color mapping table including at least one mapped color and a color value range of each mapped color;

acquiring a color value of each feature color of the preset quantity of feature colors; and mapping each feature color of the preset quantity of feature colors to a mapped color in the preset first color mapping table according to the preset first color mapping table and the color value of each feature color of the preset quantity of feature colors.

Alternatively, furthermore, when executing the step of performing mapping processing on the preset quantity of feature colors, to obtain the preset quantity of mapped colors, the processor 201 specifically executes the following steps:

reading a preset second color mapping table, the preset second color mapping table including at least one mapped color and a color value of each mapped color;

acquiring a color value of each feature color of the preset quantity of feature colors;

calculating a Euclidean distance between each feature color of the preset quantity of feature colors and each mapped color in the preset second color mapping table; and for each feature color, such as a current feature color, in the preset quantity of feature colors, determining a mapped color, having a minimum Euclidean distance from a current feature color, in the preset second color mapping table as a mapped color of the current feature color, to obtain the preset quantity of mapped colors.

Furthermore, when executing the step of performing playing control processing on the audio file by using the determined playing color, the processor 201 specifically executes the following steps:

performing color rendering processing on a playing interface of the audio file by using the determined playing colors when a playing request of the audio file is detected; and outputting the playing interface of the audio file after color rendering processing.

Furthermore, when executing the step of performing color rendering processing on a playing interface of the audio file by using the determined playing colors, the processor 201 specifically executes the following steps:

determining a color rendering processing area in the playing interface of the audio file according to a preset area range;

choosing, from the determined playing colors, at least one playing color as a background color, and performing color rendering processing on a background of the color rendering processing area; and choosing, from playing colors other than the background color of the determined playing colors, at least one playing color as a font color, and performing color rendering processing on a font of the color rendering processing area.

In the embodiment of the present invention, a playing color of an audio file is determined based on color analysis on an album image corresponding to an audio file. Because an album image can represent a style property of a corresponding audio file to a certain degree, a playing color determined based on the album image can represent the style property of the audio file in a personalized and unique manner; and in the embodiment of the present invention, playing control processing is performed on the audio file by using the determined playing color(s), thereby effectively improving intelligence of playing control processing of an audio file.

Figure 10:
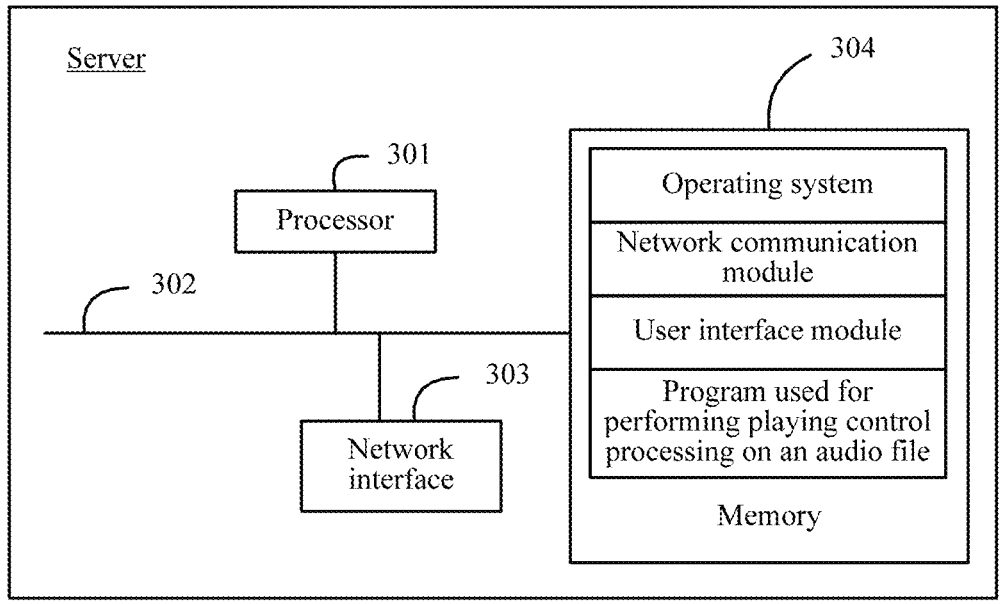
FIG. 10 is a schematic structural diagram of a server provided in an embodiment of the present invention.

Referring to FIG. 10, FIG. 10 is a schematic structural diagram of a server provided in an embodiment of the present invention. The server in the embodiment of the present invention includes: at least one processor 301 (for example, a CPU), at least one communication bus 302, at least one network interface 303, and a memory 304. The communication bus 302 is configured to implement connection and communication between these components. The network interface 303 may optionally include a standard wired interface and/or wireless interface (for example, a WI-FI interface or mobile communication interface). The memory 304 may be a high-speed RAM memory, or may be a non-volatile memory, for example, at least one magnetic disk memory. The memory 304 optionally may further be at least one storage apparatus that is located far away from the foregoing processor 301. As shown in FIG. 10, the memory 304 used as a computer storage medium stores an operating system and a network communication module, and stores a program used for performing playing control processing on an audio file and other program. In one embodiment, the memory 304 may be a non-transitory computer readable storage medium including a computer executable instruction stored thereon. When being executed by a processor of a computer, the computer executable instruction is used for executing the disclosed method for playing control processing of an audio file.

Specifically, the processor 301 may be configured to invoke the program used for performing playing control processing on an audio file stored in the memory 304, to execute the following steps:

acquiring an album image corresponding to an audio file to be processed;

performing color analysis on the album image, to determine playing colors of the audio file; and performing playing control processing on the audio file by using the determined playing colors.

Furthermore, when executing the step of performing color analysis on the album image, to determine a playing color of the audio file, the processor 301 specifically executes the following steps:

acquiring colors of specified pixel points of the album image;

extracting a preset quantity of feature colors from the colors of the specified pixel points of the album image;

determining the preset quantity of feature colors as the playing colors of the audio file.

Furthermore, after executing the step of extracting a preset quantity of feature colors from the colors of the specified pixel points of the album image, the processor 301 may further execute the following steps:

performing mapping processing on the preset quantity of feature colors, to obtain the preset quantity of mapped colors, where the determining the extracted preset quantity of feature colors as the playing colors of the audio file specifically includes: determining the preset quantity of mapped colors as the playing colors of the audio file.

Furthermore, when executing the step of performing mapping processing on the preset quantity of feature colors, to obtain the preset quantity of mapped colors, the processor 301 specifically executes the following steps:

reading a preset first color mapping table, the preset first color mapping table including at least one mapped color and a color value range of each mapped color;

acquiring a color value of each feature color of the preset quantity of feature colors; and mapping each feature color of the preset quantity of feature colors to a mapped color in the preset first color mapping table according to the preset first color mapping table and the color value of each feature color of the preset quantity of feature colors.

Alternatively, furthermore, when executing the step of performing mapping processing on the preset quantity of feature colors, to obtain the preset quantity of mapped colors, the processor 301 specifically executes the following steps:

reading a preset second color mapping table, the preset second color mapping table including at least one mapped color and a color value of each mapped color;

acquiring a color value of each feature color of the preset quantity of feature colors;

calculating a Euclidean distance between each feature color of the preset quantity of feature colors and each mapped color in the preset second color mapping table; and for each feature color, such as a current feature color, in the preset quantity of feature colors, determining a mapped color, having a minimum Euclidean distance from a current feature color, in the preset second color mapping table as a mapped color of the current feature color, to obtain the preset quantity of mapped colors.

Furthermore, when executing the step of performing playing control processing on the audio file by using the determined playing color, the processor 301 specifically executes the following steps:

performing color rendering processing on a playing interface of the audio file by using the determined playing colors when a playing request of the audio file is detected; and outputting the playing interface of the audio file after color rendering processing.

Furthermore, when executing the step of performing color rendering processing on a playing interface of the audio file by using the determined playing colors, the processor 301 specifically executes the following steps:

determining a color rendering processing area in the playing interface of the audio file according to a preset area range;

choosing, from the determined playing colors, at least one playing color as a background color, and performing color rendering processing on a background of the color rendering processing area; and choosing, from playing colors other than the background color of the determined playing colors, at least one playing color as a font color, and performing color rendering processing on a font of the color rendering processing area.

In the embodiment of the present invention, a playing color of an audio file is determined based on color analysis on an album image corresponding to an audio file. Because an album image can represent a style property of a corresponding audio file to a certain degree, a playing color determined based on the album image can represent the style property of the audio file in a personalized and unique manner. In the embodiment of the present invention, playing control processing is performed on the audio file by using the determined playing color(s), thereby effectively improving intelligence of playing control processing of the audio file.

A person of ordinary skill in the art may understand that all or a part of the procedures of the embodiments may be implemented by a computer program instructing relevant hardware. The program may be stored in a computer readable storage medium. When the program is run, the procedures of the embodiments of the foregoing methods may be performed. The storage medium may be a magnetic disk, an optical disc, a read-only memory (ROM), a random access memory (RAM) or the like.

Specifically, an embodiment of the present invention provides a storage medium including a computer executable instruction, the computer executable instruction being used for, when being executed by a processor of a computer, executing a method for playing control processing of an audio file, the method including:

acquiring an album image corresponding to an audio file to be processed;

performing color analysis on the album image, to determine a playing color of the audio file; and performing playing control processing on the audio file by using the determined playing color.

The method may specifically include the method for playing control processing of an audio file provided in any embodiment of the present invention.

Only the preferred embodiments of the present invention are disclosed above, and certainly should not be used to limit the claims of the present disclosure. Therefore, equivalent changes made in accordance with the claims shall still fall within the scope of the present disclosure.

What is claimed is:

1. A method for playing control processing of an audio file, comprising:

acquiring an album image corresponding to an audio file to be processed;

performing color analysis on the album image, to determine playing colors of the audio file by:

acquiring colors of specified pixel points of the album image, extracting a preset quantity of feature colors from the colors of the specified pixel points of the album image, acquiring a color value of each feature color of the preset quantity of feature colors;

reading a color mapping table comprising a plurality of preset colors and mapping criteria corresponding to each preset color, determining, for each feature color of the preset quantity of feature colors, a mapped preset color according to the color value of the feature color and the mapping criteria of the color mapping table, to obtain the preset quantity of mapped preset colors, and determining the preset quantity of mapped preset colors as playing colors of the audio file; and performing the playing control processing on the audio file by using the determined playing colors.

2. The method according to claim 1, wherein:

the color mapping table includes a preset first color mapping table, the mapping criteria of the preset first color mapping table comprising a color value range of each preset color; and determining, for each feature color of the preset quantity of feature colors, the mapped preset color according to the color value of the feature color and the mapping criteria of the color mapping table comprises:

if a color value of a feature color is within a color value range of a first preset color specified in the preset first color mapping table, determining the first preset color as the mapped preset color corresponding to the feature color.

3. A method for playing control processing of an audio file, comprising:

acquiring an album image corresponding to an audio file to be processed;

performing color analysis on the album image, to determine playing colors of the audio file by:

acquiring colors of specified pixel points of the album image, extracting a preset quantity of feature colors from the colors of the specified pixel points of the album image, after the extracting a preset quantity of feature colors from the colors of the specified pixel points of the album image, performing a mapping processing on the preset quantity of feature colors, to obtain the preset quantity of mapped colors;

determining the preset quantity of feature colors as playing colors of the audio file, including: determining the preset quantity of mapped colors as the playing colors of the audio file; and performing the playing control processing on the audio file by using the determined playing colors, wherein the performing mapping processing on the preset quantity of feature colors, to obtain the preset quantity of mapped colors comprises:

reading a preset second color mapping table, the preset second color mapping table comprising at least one mapped color and a color value of each mapped color;

acquiring a color value of each feature color of the preset quantity of feature colors;

calculating a Euclidean distance between each feature color of the preset quantity of feature colors and each mapped color in the preset second color mapping table; and for each current feature color of the preset quantity of feature colors, determining a mapped color, having a minimum Euclidean distance from a current feature color, in the preset second color mapping table as a mapped color of the current feature color, to obtain the preset quantity of mapped colors.

4. The method according to claim 1, wherein the performing the playing control processing on the audio file by using the determined playing color comprises:

performing a color rendering processing on a playing interface of the audio file by using the determined playing colors when a playing request of the audio file is detected; and outputting the playing interface of the audio file after the color rendering processing.

5. The method according to claim 4, wherein the performing a color rendering processing on a playing interface of the audio file by using the determined playing colors comprises:

determining a color rendering processing area in the playing interface of the audio file according to a preset area range;

selecting, from the determined playing colors, at least one playing color as a background color, and performing the color rendering processing on a background of the color rendering processing area; and selecting, from playing colors other than the background color of the determined playing colors, at least one playing color as a font color, and performing color rendering processing on a font of the color rendering processing area.

6. An apparatus for playing control processing of an audio file, comprising:

a memory; and a processor coupled to the memory and configured to:

acquire an album image corresponding to an audio file to be processed;

perform color analysis on the album image, to determine playing colors of the audio file, comprising:

acquiring colors of specified pixel points of the album image, extracting a preset quantity of feature colors from the colors of the specified pixel points of the album image, acquiring a color value of each feature color of the preset quantity of feature colors;

reading a color mapping table comprising a plurality of preset colors and mapping criteria corresponding to each preset color, determining, for each feature color of the preset quantity of feature colors, a mapped preset color according to the color value of the feature color and the mapping criteria of the color mapping table, to obtain the preset quantity of mapped preset colors, and determining the preset quantity of mapped preset colors as playing colors of the audio file; and perform playing control processing on the audio file by using the determined playing colors.

7. The apparatus according to claim 6, wherein:

the color mapping table includes a preset first color mapping table, the mapping criteria of the preset first color mapping table comprising a color value range of each preset color; and the processor is further configured to: if a color value of a feature color is within a color value range of a first preset color specified in the preset first color mapping table, determine the first preset color as the mapped preset color corresponding to the feature color.

8. The apparatus according to claim 6, wherein:

the color mapping table includes a preset second color mapping table, the mapping criteria of the preset second color mapping table comprising a color value of each mapped color; and the processor is further configured to:

respectively calculate a Euclidean distance between a current feature color of the preset quantity of feature colors and each preset color in the preset second color mapping table, to obtain a plurality of Euclidean distances of the current feature color corresponding to the plurality of the preset colors; and if a second preset color corresponds to a minimum Euclidean distance among the plurality of Euclidean distances from the current feature color, determine the second preset color as the mapped preset color corresponding to the feature color.

9. The apparatus according to claim 6, wherein the processor is further configured to:

perform a color rendering processing on a playing interface of the audio file by using the determined playing colors when a playing request of the audio file is detected; and output the playing interface of the audio file after the color rendering processing.

10. The apparatus according to claim 9, wherein the processor is further configured to:

determine a color rendering processing area in the playing interface of the audio file according to a preset area range;

select, from the determined playing colors, at least one playing color as a background color, and perform the color rendering processing on a background of the color rendering processing area; and select, from playing colors other than the background color of the determined playing colors, at least one playing color as a font color, and perform color rendering processing on a font of the color rendering processing area.

11. The method according to claim 1, wherein:

the color mapping table includes a preset second color mapping table, the mapping criteria of the preset second color mapping table comprising a color value of each preset color;

determining, for each feature color of the preset quantity of feature colors, the mapped preset color according to the color value of the feature color and the mapping criteria of the color mapping table comprises:

respectively calculating, a Euclidean distance between a feature color and each preset color in the preset second color mapping table, to obtain a plurality of Euclidean distances of the feature color corresponding to the plurality of the preset colors; and if a second preset color corresponds to a minimum Euclidean distance among the plurality of Euclidean distances, determining the second preset color as the mapped preset color corresponding to the feature color.

* * * * *